United States Patent [19]
Gowen

[11] Patent Number: 5,145,283
[45] Date of Patent: Sep. 8, 1992

[54] EFFICIENCY OF LAYING PIPE

[76] Inventor: Richard T. Gowen, R.F.D. Goves La., Wentworth, N.H. 03282

[21] Appl. No.: 716,088

[22] Filed: Jun. 17, 1991

[51] Int. Cl.$^5$ .............................................. B65D 59/06
[52] U.S. Cl. ...................................... 405/157; 405/154; 285/381; 156/86; 138/96 T
[58] Field of Search ............... 405/154, 155, 156, 157, 405/184; 285/381; 138/96 R, 96 T; 156/86

[56] References Cited

U.S. PATENT DOCUMENTS

| | | | |
|---|---|---|---|
| 2,371,913 | 3/1945 | Phillips | 138/96 R |
| 3,078,879 | 2/1963 | Mallard | 138/96 R |
| 3,226,807 | 7/1966 | Orr | 156/86 X |
| 3,412,524 | 11/1968 | Nestell et al. | 156/86 X |
| 3,587,654 | 6/1971 | Yocum | 138/96 |
| 4,300,328 | 11/1981 | Carlsen | 53/492 |
| 4,757,595 | 7/1988 | Fraering | 138/96 T X |

FOREIGN PATENT DOCUMENTS

| | | | |
|---|---|---|---|
| 1952490 | 4/1970 | Fed. Rep. of Germany | 138/96 R |
| 153465 | 6/1989 | Japan | 138/96 R |

*Primary Examiner*—Randolph A. Reese
*Assistant Examiner*—Arlen L. Olsen
*Attorney, Agent, or Firm*—Robert K. Tendler

[57] ABSTRACT

For gasketing slip joint applications, a method is disclosed for clean pipe laying involving shrink wrapping the bells and spigots of pipes and conduits prior to their installation in the field and circumferentially cutting an aperture in the shrink wrap at the end of the pipe to permit insertion of the end of a mating pipe. The above procedure provides a clean environment so that contaminants do not enter the pipe and eliminates the cleaning step normally necessary when joining or connecting water, sewer, or drainage pipe in an excavated trench. In the case of water, sewer, or drainage pipe, the O-ring seal of the bell is lubricated and then this end of the pipe is shrink wrapped, as is the mating tapered pipe to be inserted into the bell. The shrink wrap prevents contaminants from the excavation or otherwise from entering into either of the pipes to be joined, thereby eliminating joint failure due to contamination during installation as well as pipeline contamination in general. In one embodiment, a precut piece of heat shrinkable plastic material is positioned over the end of the pipe and secured to the end of the pipe such that when heated the shrink wrap closes tightly around the end of the pipe or spigot. Additonally, the shrink wrap material is provided in bag form with a pulltie so as to locate and secure the bag over the pipe during the heating process. Additionally, a pulltag incorporated into the bag facilitates removal of the plastic from the bell or spigot through pulling of the tag which severs the shrink wrap along a score line so that it may be removed.

7 Claims, 3 Drawing Sheets

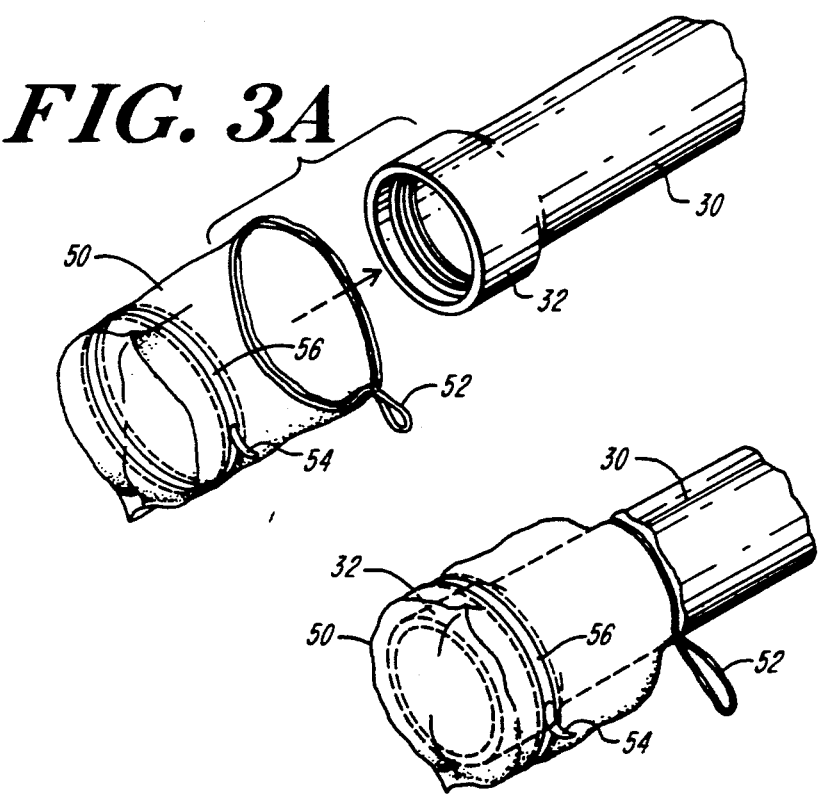
FIG. 3A
FIG. 3B
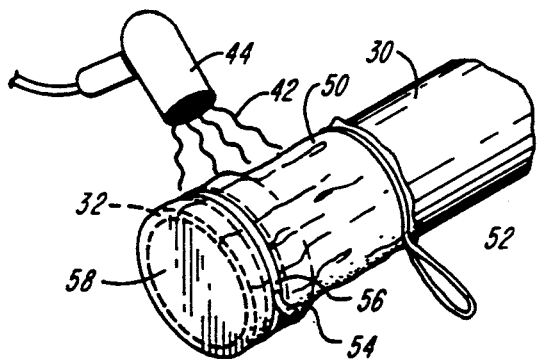
FIG. 3C
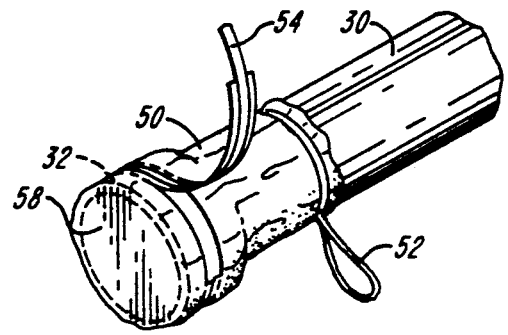
FIG. 3D

EFFICIENCY OF LAYING PIPE

FIELD OF THE INVENTION

This invention relates to the laying of pipe and more particularly for a method of preventing contaminants from entering the pipe for both decreasing installation time and for better quality control over the pipeline itself.

BACKGROUND OF THE INVENTION

Water, sewer, and drainage pipe are laid in excavated trenches, sewer, and drainage starting from a manhole and water usually starting from an existing pipeline and working outwardly. As a pipe section is joined to another pipe section, the trench is further excavated while the previous pipe is being backfilled in an ongoing process. During the excavation for the next section, the previously laid pipe is subject to contamination due to particulate matter from backfilling of the previous pipe as well as from ongoing excavation. In most instances, this requires the wiping and brushing of the inside of the already laid end of the pipe which is a time consuming and inconvenient process. In some installations, the process of cleaning can take upwards of three minutes which, under current conditions can result in additional cost on the order of many dollars per minute.

If the individual sections of pipe are not cleaned during installation, the result is often failure of a subsequent leak test. Moreover, contaminants are of a more troublesome nature in the laying of water pipe, since the pipe, after installation must be sterilized or cleaned with chlorine. If dirt is not totally removed from a water line, it will eventually work into individual faucets and plumbing fixtures alike. Moreover, there is no protection for pipe during installation against airborne contaminants when the pipe is lying around or in fact protection against urine from animals or humans.

Another problem is safety. While a pipe layer is cleaning the bell of a pipe, he or she is usually on their knees or bent over in the trench. While their eyes are focused on the bell, they are cleaning and lubricating, and they obviously cannot be aware of any shifting of the open excavation. This means that they could be caught in a cave-in and could be in a very poor situation for escaping.

As shown in U.S. Pat. Nos. 2,708,950; 2,942,625; and 4,717,608, in the past there have been both protective caps and coverings for pipes, with U.S. Pat. No. 4,168,726 indicating a bag-type device over the end of a test port having a securing steel band for the bag.

With respect to heat shrinkable material and the sealing of pipes in the form of a cap, U.S. Pat. No. 4,569,868 indicates a tubular cap in which an intermediate section has sections of the device. Also, U.S. Pat. No. 4,300,328 illustrates the utilization of heat shrinkable material around a wire in which the material is removable through the longitudinal splitting of the cylindrical tube by virtue of a longitudinally-running wire within the material. Note U.S. Pat. Nos. 4,386,984; 4,163,117; and 4,297,155 also show heat shrink material. Note that U.S. Pat. No. 4,158,407 indicates the sealing of a journal through the utilization of a journal guard which is secured at its distal end via a band.

Other U.S. Patents relating to the sealing of pipes, albeit not at their ends, include U.S. Pat. Nos. 4,699,821; 4,532,168; 4,442,153; 4,442,154; 4,442,155; 4,802,509; 4,517,234; 4,472,468; 4,371,578; and 4,731,273.

While the above patents do not relate specifically to the utilization of shrink wrap material for the ends of conduits to prevent internal contamination of the conduit during pipe laying, U.S Pat. No. 4,757,595 illustrates the utilization of shrink wrap for protecting the outside threads of a drill pipe. It will be appreciated that this patent is directed to problems associated not with internal contamination of pipes due to the drilling operation, but rather the integrity of external threads on a pipe which, as will be appreciated, are joined together at a drill site through the threading of one pipe onto another.

This patent is not directed to gasketed slip joint applications which are common in the laying of water and sewer pipe in which an end of one pipe is inserted into the aperture and of another pipe and is press fit thereinto by virtue of an internal O-ring gasketing arrangement. There are no external threads and no threading problem whatsoever with respect to the installation of water and sewer pipe.

Moreover, this latter-mentioned patent does not involve the removal of the shrink wrap material by cutting a circumferential aperture in the end of the material so as to permit the introduction of a mating slip joint pipe end into the previously sealed end of a pipe. Thus, a simple system of shrink wrap removal is not shown in this patent, it being understood that the entire shrink wrap assembly must be removed to permit the pipe threading operation.

It will thus be appreciated that U.S. Pat. No. 4,757,595 does not address or solve the problems of pipe laying, but rather solves a different problem involved with the exterior threads in an oil well drilling application.

SUMMARY OF THE INVENTION

In order to counter these problems, in the subject method, the individual sections of pipe are protected through a shrink wrap of their ends such that all pipe is closed to the elements prior to installation. The shrink wrapping process is one which is relatively inexpensive in which the sealing material is easily removed at the time of installation. Rather than having a physical cap or insert in the pipe, in the subject invention each of the pipe sections is provided with a shrink wrap bag which can be field installed or installed either by a distributor or by the manufacturer of the pipe. More conveniently, since lubricants are normally utilized with internal O-rings in the bell of a pipe, the shrink wrap bag or closure can be applied after an initial lubricating step.

The subject method therefore eliminates not only the step of cleaning of the pipe prior to installation, with the cleaning taking place in the trench, but also eliminates the lubrication problem which may be made more uniform when the pipe is out of the excavation and on supports such as saw horses.

The result of utilizing the subject method is that installation time can be cut down by as much as three minutes per joint, which results in considerable cost savings. Moreover, because the lubrication is applied in a more favorable environment outside of the trench, lubrication integrity is much greater resulting in fewer failed pressure tests.

In a typical installation, assuming several tens of thousands of feet of pipe, savings in installation time can amount to many thousands of dollars. This, when compared to the minimal cost of lubricating pipe seals and shrink wrapping indicates the efficiency of the subject method.

In one embodiment the shrink wrap is cut into a square piece of material which is placed around the end of a pipe. To keep the shrink wrap in place, a drawstring is provided to secure the distal end of the shrink wrap around the pipe end. Thereafter heat is applied to shrink the proximal end of the shrink wrap around the end of the pipe so as to seal and close it against the elements. This drawstring or pulltie effectuates time saving in the preparation of the pipe ends prior to installation.

As another improvement, the shrink wrapped bag is provided with a pulltag which, when pulled scores and tears the bag material at a score line so as to permit easy removal of the shrink wrap bag during installation in the trench. All of the above method steps result in an efficient pipe laying operation.

In general one aspect of the subject invention involves bagging the end of the pipe and cutting an aperture at the end to be joined in the trench just prior to the joining operation.

It will be appreciated that if the shrink wrap is transparent, it is possible to pass a laser beam through the pipe and through the shrink wrap at the end of the pipe so as to facilitate pipe section alignment.

What is therefore provided is apparatus to enable the efficient joining of pipes within an excavation, in which separate insertable seals are eliminated and in which costly caps need not be provided in order to seal the pipes prior to the joining thereof. It will be noted that the shrink wrap material may be buried with the pipes without causing significant environmental damage so that removal of the material during the pipe laying procedure is not a factor.

In summary, for gasketing slip joint applications, a method is disclosed for clean pipe laying involving shrink wrapping the bells and spigots of pipes and conduits prior to their installation in the field and circumferentially cutting an aperture in the shrink wrap at the end of the pipe to permit insertion of the end of a mating pipe. The above procedure provides a clean environment so that contaminants do not enter the pipe and eliminates the cleaning step normally necessary when joining or connecting water, sewer, or drainage pipe in an excavated trench. In the case of water, sewer or drainage pipe, the 0-ring seal of the bell is lubricated and then this end of the pipe is shrink wrapped, as is the mating tapered pipe to be inserted into the bell. The shrink wrap prevents contaminants from the excavation or otherwise from entering into either of the pipes to be joined, thereby eliminating joint failure due to contamination during installation as well as pipeline contamination in general. In one embodiment, a precut piece of heat shrinkable plastic material is positioned over the end of the pipe and secured to the end of the pipe such that when heated the shrink wrap closes tightly around the end of the pipe or spigot. Additionally, the shrink wrap material is provided in bag form with a pulltie so as to locate and secure the bag over the pipe during the heating process. Additionally, a pulltag incorporated into the bag facilitates removal of the plastic from the bell or spigot through pulling of the tag which severs the shrink wrap along a score line so that it may be removed.

BRIEF DESCRIPTION OF THE DRAWINGS

These and other features of the subject invention will be better understood in connection with the drawings of which:

FIG. 3A is an exploded and diagrammatic illustration of a second embodiment of the subject invention in which a bag of shrink wrap material having a draw string and a circumferential severing strap is provided over the end of a pipe to be sealed;

FIG. 3B is a diagrammatic illustration of the result of the operation of FIG. 3A in which the unshrunk bag of shrink wrap material is positioned over the aforementioned pipe end;

FIG. 3C illustrates the result of heating the shrink wrap material of FIG. 3B so as to form a seal at the end of the pipe and, FIG. 3D is a diagrammatic illustration of the removal of the shrink wrap material at the end of the pipe so as to provide a circumferential scoring and removal of the shrink wrap material at the end of the pipe.

DETAILED DESCRIPTION

Figure 1:
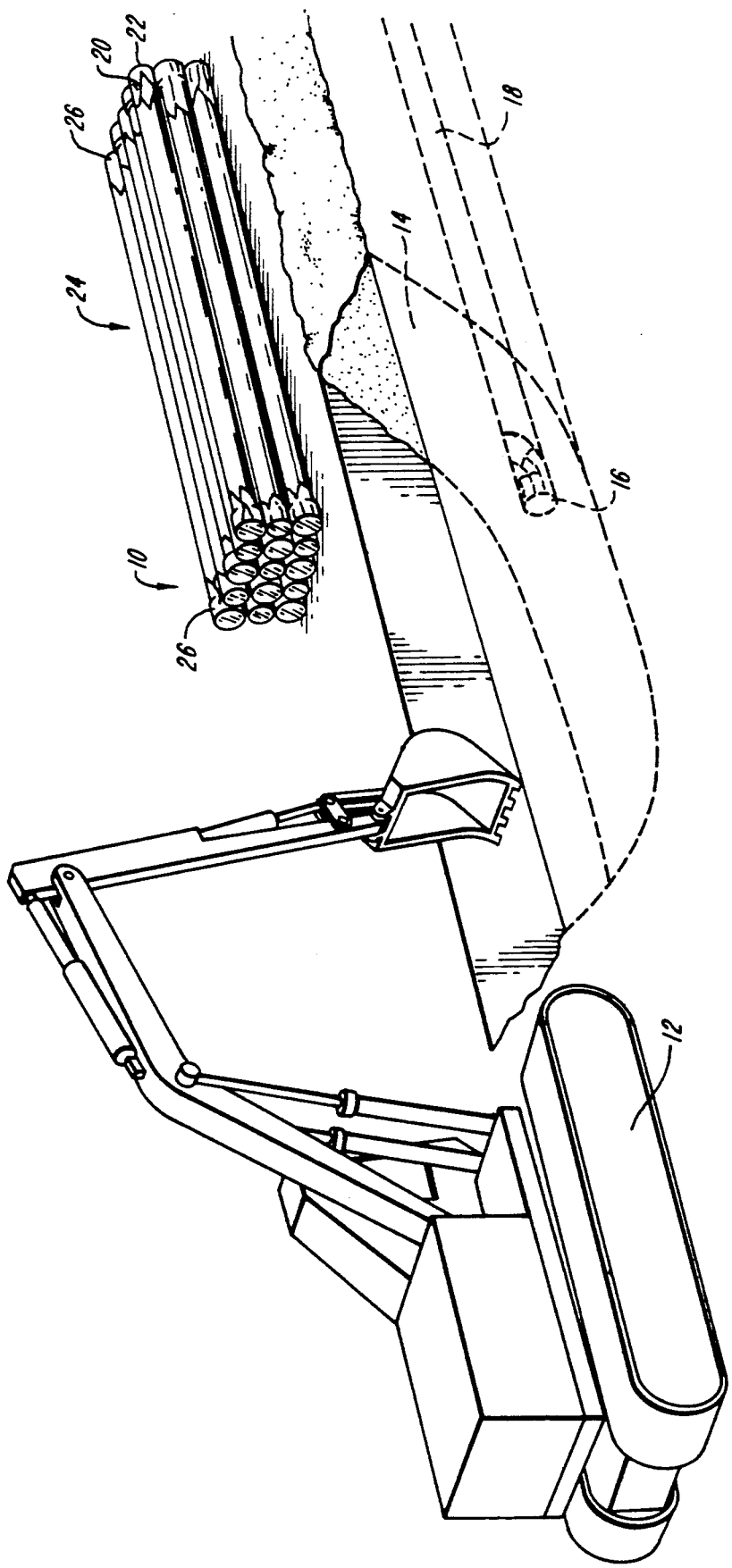
FIG. 1 is a diagrammatic representation of a pipe laying operation in which pipe to be laid in a trench is sealed against contamination by virtue of a shrink wrapping of the ends thereof.

Referring now to FIG. 1, in a typical pipe laying situation as depicted by reference character 10, a back hoe or other device 12 is utilized to dig a trench 14 away from the end 16 of a previously laid pipe 18 such that a prepared pipe 20 may have an end 22 inserted into end 16 of pipe 18 in a gasketed slip joint arrangement in which typically the internal gasket of the pipe (not shown) of the laid pipe is adapted to receive in a press fit end 22 of the pipe to which it is to be joined.

As can be seen by the stack of pipes or conduits 24, each of the individual pipes is provided with a shrink wrap cover 26 at each end thereof. The shrink wrap is utilized to protect the interior of the pipe from contamination and also to protect the internally supplied grease around the gasket to prevent contamination of the grease and also to prevent the grease from coming out of the pipe.

In operation, a previously laid pipe has its shrink wrap end opened by virtue of a circumferential slit so as to provide an aperture at this end of the pipe, whereas the pipe to which it is to be attached has its end also apertured by providing a circumferential slit in the shrink wrap material. This operation is done in trench 14 so as to minimize the possibility of contamination during transport of unprotected pipe and is accomplished very simply either with a knife or with a pull tab scoring mechanism to be described.

It will be appreciated that a substantial amount of time is saved by virtue of the providing of the pipe with the shrink wrap protection due to the ease of removal of the shrink wrap material through the aforementioned circumferential aperturing technique.

The speed with which the pipe is laid is also a function of the removal of the several older pipe laying steps involving the swabbing of the ends of the pipe as well as applying grease to the internal gasket while the pipe is in the trench.

Figure 2A:
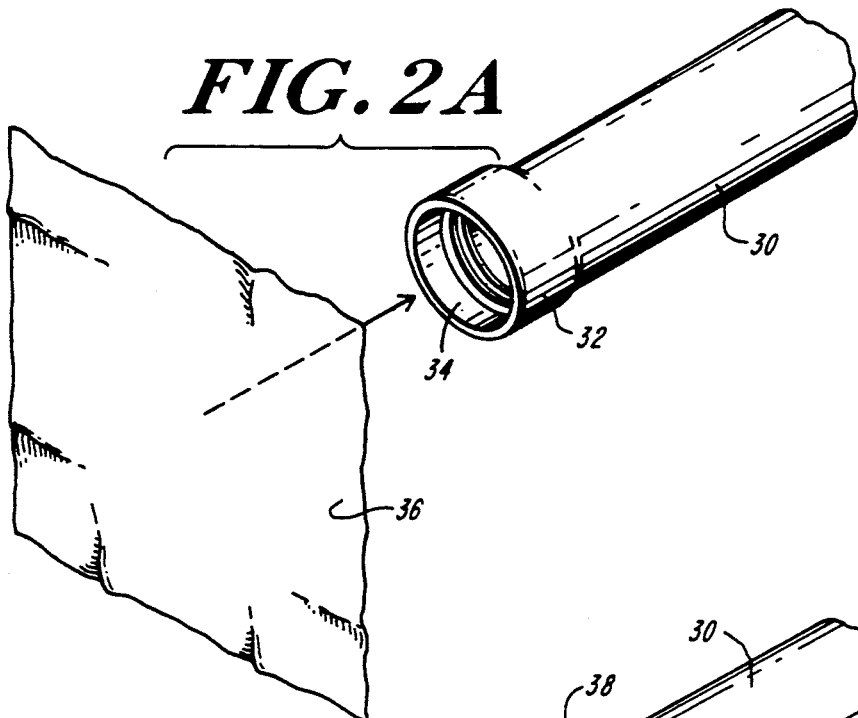
FIG. 2A is a diagrammatic representation of the application of a rectilinear sheet of shrink wrapping material to the end of a pipe.

Referring now to FIG. 2A, a pipe 30 may having an end 32 provided with an internal gasket 34 which may or may not be lubricated. The end of this pipe may be sealed by virtue of a rectilinear blank of shrink wrap material 36 which is adapted to be placed over the pipe as illustrated in FIG. 2B such that the shrink wrap material has its ends 38 drawn rearwardly along the surface 40 of pipe 30.

Figure 2B:
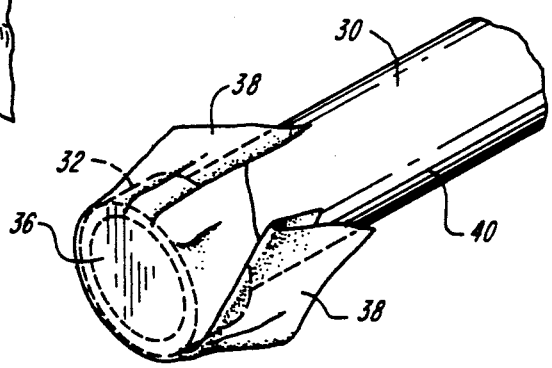
FIG. 2B is a diagrammatic representation of a rectilinear sheet of shrink wrapping material on the end of a pipe before heat treating.
Figure 2C:
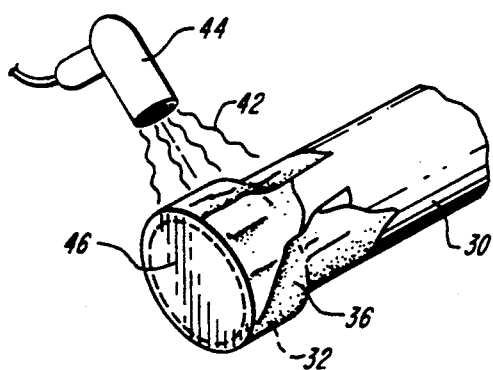
FIG. 2C is a diagrammatic representation of the result of heating treating the material and the structure of FIG. 2B.
Figure 2D:
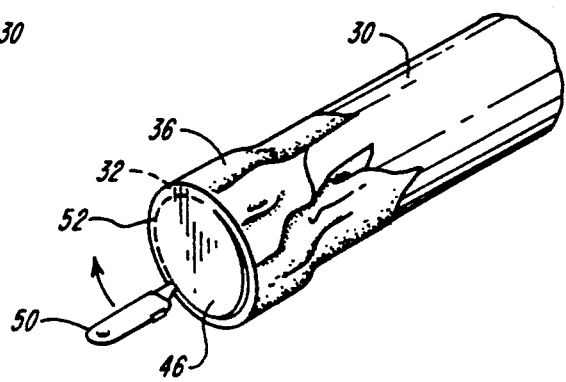
FIG. 2D is a diagrammatic representation of the cutting of a circumferential slot in the face of the shrink wrap material so as to permit the insertion of a slip jointed pipe vent into the aperture formed by the removal of the shrink wrap material at the aperture of the end of the pipe.

Referring to FIG. 2C, the pipe shrink wrap combination of FIG. 2B is heated by virtue of hot air 42 being projected towards the shrink wrap material 36, as for instance, by a hairdryer 44 or other source of heat. This provides a face 46 of the shrink wrap material which is drum-tight across the open end of pipe 30.

In order to permit installation of the slip-jointed pipe sections, a knife generally indicated by reference character 50 is used to provide a circumferential cut 52 in the face 46 of shrink wrap material 36, such that an aperture is formed in end 32 of pipe 30 to expose the interior thereof, thereby to permit the insertion of a mating pipe end portion.

Referring to FIG. 3A, pipe 30 may be provided with a shrink wrap type bag structure generally indicated by reference character 50. This bag is substantially cylindrical in nature having a drawstring 52 in the distal end thereof and having a pull tab scoring arrangement 54 at the proximal end thereof, with this arrangement including a circumferential tape 56 as illustrated.

Referring to FIG. 3B, the structure illustrated in FIG. 3A is positioned over the end 32 of pipe 30 and the drawstring 52 is drawn tight to secure the bag over the end of the pipe.

Referring to FIG. 3C, the structure of FIG. 3B is subjected to heat in the form of hot air 54, from, for instance, a hair dryer 56 or other heat source, again to provide a drum-tight face 58 of heat shrinkable material across the end 32 of pipe 30.

In operation and referring to FIG. 3D, the end portion 58 of shrink wrap material 50 is removed by pulling on tab 54 so as to sever the adjacent portions of the shrink wrap material in a circumferential manner.

The above provides that exceedingly simple mechanism for providing the required circumferential aperture in the shrink wrap material so as to expose the ends of the pipe to be joined or mated in a slip joint fashion.

Having above indicated a preferred embodiment of the present invention, it will occur to those skilled in the art that modifications and alternatives can be practiced within the spirit of the invention. It is accordingly intended to define the scope of the invention only as indicated in the following claims:

What is claimed is:

1. Apparatus for improving the efficiency of joining pipe sections in a gasketed slip joint application in which a portion of the pipe sealing means is left in place after joining two mating sections comprising:

a section of pipe having two ends;
   shrink wrap closure means including material having a distal edge and positioned at each of the ends of said pipe section such that each end of said pipe section is sealed against contamination by virtue of the shrinking of said shrink wrap means about each end of the pipe; and
   means for providing a circumferential circular slit in said shrink wrap closure means at or adjacent an end of said pipe section to expose the interior of the pipe such that the end of a mating pipe section can be inserted therein without removal of shrink wrap from said pipe adjacent said circumferential slit, said circumferential slitting means including circumferential scoring means, wherein said circumferential scoring means including a band adhered to said shrink wrap closure means removed from said distal edge.

2. The apparatus of claim 1 wherein an end of said pipe section includes internal gasketing means thereat.

3. The apparatus of claim 2 and further including lubricant deposited at said-gasket.

4. The apparatus of claim 3 wherein said lubricant is grease.

5. The apparatus of claim 4 wherein said bag has an open end and further including draw string means at the open end of that bag for holding said bag over the end of said pipe section prior to the application of heat thereto for the shrinking thereof onto the end of said pipe.

6. The apparatus of claim 1 wherein said shrink wrap closure means is in the form of a bag.

7. A method for the joining of pipe sections in an excavated trench, with each section having a bell and a spigot so as to preclude contamination to the interior of laid pipe sections during the pipe laying operation comprising:

adhering a circumferential scoring means to a piece of shrink wrap material at a position removed from the distal edge thereof;
   providing both the spigot and the bell of a pipe section with an overlying layer of the shrink warp material shrunk over the ends prior to the joining of mating pipe sections together;
   placing the abutting and mating bells and spigots of mating pipe sections in alignment within the excavated trench;
   removing that portion of the shrink wrap at the open portion of the associated bell and spigot by circumferentially slitting the shrink wrap material thereat by the scoring means and pushing the spigot into the bell to effectuate a slip joint while leaving remaining shrink wrap material on the respective spigot and bell.

* * * * *